United States Patent Office 3,166,697
Patented Jan. 19, 1965

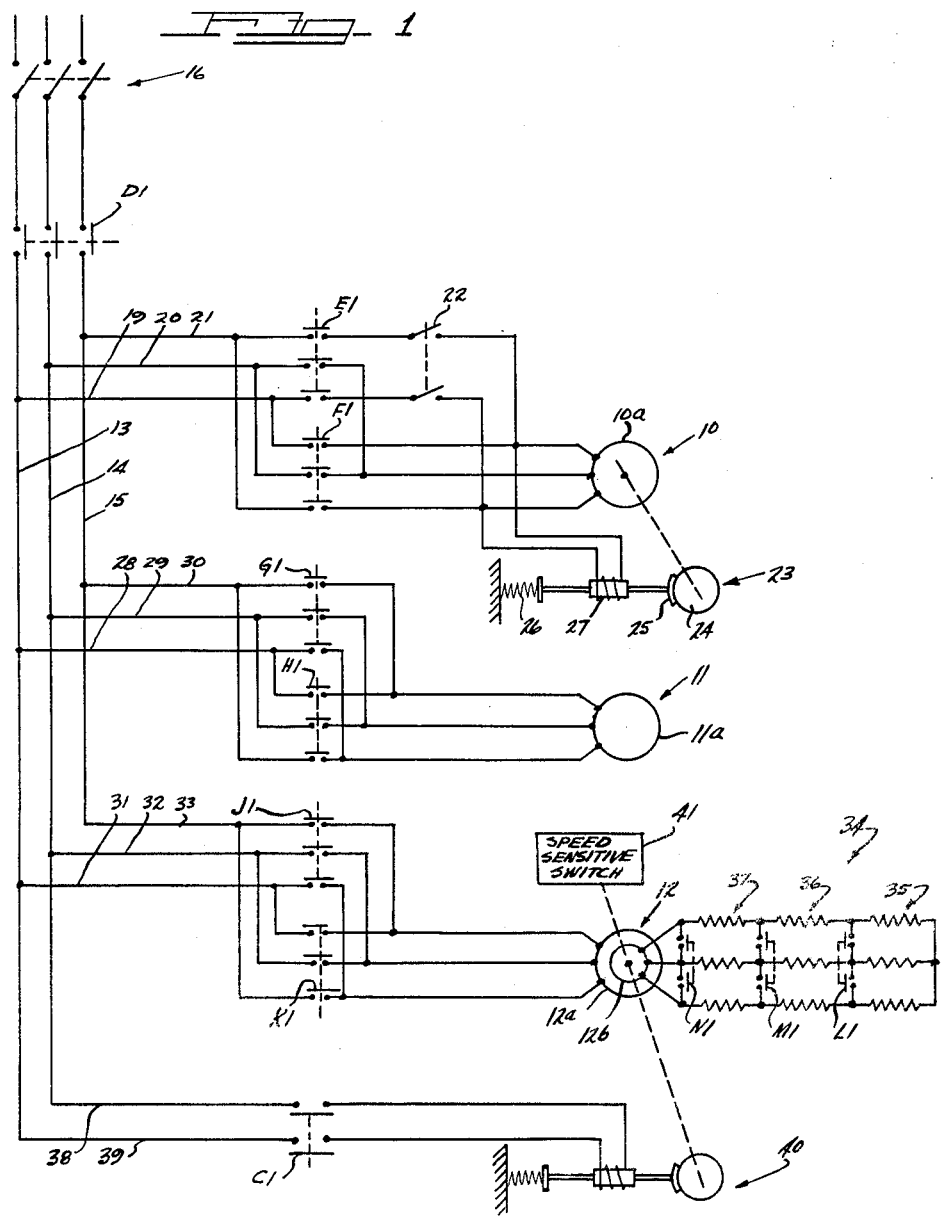

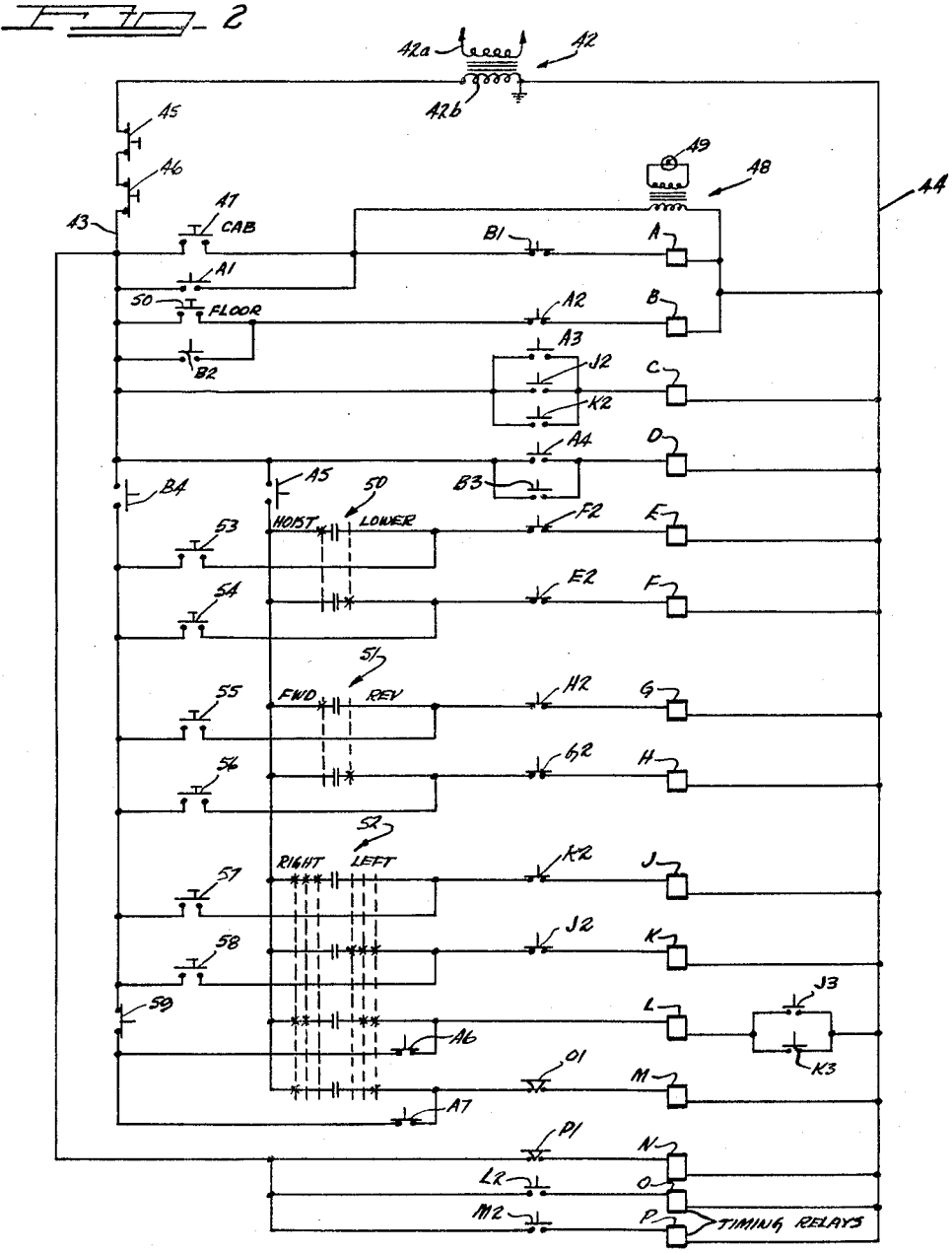

3,166,697
DUAL MOTOR CONTROL SYSTEM FOR CRANES
Edward Alexander Horsley, Niagara Falls, Ontario, Canada, assignor to Provincial Engineering Ltd., Niagara Falls, Ontario, Canada, a corporation of Canada
Filed Mar. 31, 1961, Ser. No. 99,836
3 Claims. (Cl. 318—17)

This invention relates to control systems for induction motor drives and, more particularly, to dual control systems for wound rotor induction motors that are especially adapted for use with cranes.

Overhead cranes of the type that are mounted on tracks over a shop floor ordinarily have at least one induction motor coupled to the bridge to drive it along the tracks. Very frequently cranes of this type have dual controls so that they can be operated either by a man in the bridge cab during the busy working hours or by a man on the floor during low activity periods.

Difficulty has been experienced when the two sets of controls are identical because when the bridge drive is slow enough so that an operator can walk along the floor when using the floor controls, the bridge will travel much too slow when the operator is riding in the bridge cab. Various mechanisms have been used to overcome these difficulties such as two speed squirrel cage induction motors, but they have not been entirely successful in most respects.

Accordingly, it is an object of this invention to overcome the deficiencies of the prior art by providing an improved dual control system for wound rotor induction motors. In accordance with this invention, a resistance network and an accelerating circuit are connected in the rotor winding circuit which are available to both the floor and cab controls. Additional means are provided for cutting out the accelerating circuit to prevent excessive speeds when the floor controls are being used. When using such a control system from the floor the bridge will travel at a nearly constant speed regardless of the hook load or the track conditions, and this speed can be pre-adjusted to be within normal walking speeds.

It is another object of this invention to provide a control system which can be conditioned for either floor or cab operation by simply closing a switch located at each position.

These and other objects, features and advantages of the present invention will be fully apparent from the following detailed description taken in conjunction with the accompanying figures of the drawings, in which:

FIGURE 1 is a schematic diagram of a power system for a crane constructed in accordance with this invention; and FIGURE 2 is a schematic diagram of the control system for the crane.

The system employed to identify the components illustrated in the drawings is as follows: Letters identify the operating windings or coils of relays; letters followed by numbers identify the relay contacts actuated by the coils, the letters indicating the associated relay coils and contacts; and numbers identify the remaining components.

With reference to FIGURE 1, the power system includes three polyphase induction motors 10, 11 and 12 the motors 10 and 11 being squirrel cage rotor types and the motor 12 being a wound rotor type. It should be understood that the motors 10 and 11 could also be wound rotor types. These three motors are connected to be energized by three bus bars 13, 14 and 15 which are connected to a suitable polyphase alternating current power supply through a main switch 16. Normally open relay contacts D1 are also connected in these bus bars and are closed by the action of the control system as will be discussed hereinafter.

Three conductors 19, 20 and 21 connect the bus bars 13–15 to the primary windings 10a of the motor 10 which may be the hoist motor. An upper limit switch 22 and two sets of relay contacts E1 and F1 are connected in the lines 19 and 21. The connections are such that the contacts E1 cause the motor 10 to hoise a load when they are closed and the contacts F1 cause the motor 10 to lower the load.

The limit switch 22 is positioned so that it will be automatically opened when the hook is raised to a predetermined height.

A magnetic brake 23 for the motor 10 is also connected across the conductors 19, 20 and 21, and is adapted to automatically set when the motor power is disconnected. The brake includes a drum 24 and a shoe 25 that is urged toward the drum by a compression spring 26. A solenoid 27 pulls the shoe away from the drum when the motor 10 is energized.

The induction motor 11, which may be the trolley motor, has its primary winding 11a connected by three conductors 28–30 to the bus bars 13–15. Two sets of relay contacts G1 and H1 are provided and the connections to the motor 11 are such that the relay contacts control the direction of rotation of the motor.

The motor 12 is especially adapted to drive the bridge along the tracks and is wound rotor induction motor. The primary winding 12a of this motor is connected to the bus bars 13–15 by three conductors 31–33, and two sets of relay contacts J1 and K1 are connected in the lines to reverse the direction of current flow and the direction of rotation of the motor.

Connected to the rotor winding 12b of the motor 12 is a network 34 of resistors and accelerator contactors that is provided to vary the torque output of the motor. This network includes three sets of resistors 35, 36 and 37 and three sets of relay contacts L1, M1 and N1. In the maximum torque setting of the motor 12 the contacts N1 are closed and the entire network is shorted out, while in the minimum torque setting all of the contacts are open. At the intermediate torque settings the contacts L1 and M1 are closed. Obviously the network could be modified to include more or less resistors and relay contacts.

The bus bars 13 and 14 are also connected by two conductors 38 and 39 to a magnetic brake 40 for the bridge. The relay contacts C1 are connected in the conductors 38 and 39 in order to selectively apply power to the solenoid of this brake which may be identical with the brake 23.

A speed sensitive switch 41 is also mechanically coupled to the rotor shaft of the motor 12. This switch may be a centrifugal type having one set of normally closed contacts which open when the speed reaches a predetermined level. These contacts are connected in the control circuit, FIGURE 2, and will be discussed in greater detail hereinafter. One type of switch that has been found suitable is described in a Product Bulletin 2210 published by the Euclid Electric & Mfg. Co., of Madison, Ohio in January 1959. This switch is a type C centrifugal switch that is effective from 70 to 5000 r.p.m.

The control system illustrated in FIGURE 2 is adapted to control the operation of the relay contacts shown in FIGURE 1 which in turn control the application of power to the various motors and brakes and the motor 12 speed. It includes a transformer 42 that has its primary winding 42a connected to a suitable single phase alternating current source and its secondary winding 42b connected to two lines 43 and 44. The line 43 has two manually operable, normally closed, push-button switches 45 and 46, one of these switches being mounted at the cab control station and the other at the floor control station. Either of these switches is capable of deenergizing the entire system.

If the crane is to be operated from the cab, the manually operable, push-button start switch 47 is closed and current flows through the normally closed contacts B1 and the coil A. Current also flows through a transformer 48 which has a pilot light 49 connected across its secondary winding which indicates when the cab control station has assumed control. Upon energization of the coil A the normally open contacts A1 connected in parallel with the cab start button 47 close and form a holding circuit. The coil A also opens normally closed contacts A2 connected in series with a floor control station start button 50 and prevents the floor control station from assuming control.

In the event the floor station start button 50 is pressed prior to the start button 47 in the cab, the switch A2 will be closed and current will flow through the coil B and cause the normally closed contacts B1 to open and disable the cab control station. Coil B also closes the normally open contacts B2 and locks the system in this setting.

When the cab start button 47 is closed first, the contacts A3 are closed and the coil C is energized. This action closes the contacts C1 leading to the magnetic brake 40 for the bridge and disengages it prior to operation of the motor 12. While the crane is being operated from the cab, the contacts A3 remain closed and the magnetic brake is constantly released. Braking is then accomplished by a conventional hand or foot operated friction brake (not shown). The coil C is also energized whenever one of the contacts J2 and K2 are closed due to operation from the floor station as will be described hereinafter. Also, when either the cab or floor start button is closed one of the normally open contacts A4 and B3 is closed and the coil D is energized. The contacts D1, FIGURE 1, then close and connect the power supply to the bars 13–15, assuming that the main switch 16 is closed.

In the event the crane is to be operated from the cab, the start button 47 is pressed as previously described and the contacts A5 are also closed by the coil A, which makes a set of manual controls 50, 51 and 52 in the cab effective. These controls include a series of contacts that are operated by cams, all of the contacts being open except at the control points marked by a cross. The control 50 is connected to operate the hoist motor 10 and has hoist and lower points; the controls 51 is connected to operate the trolley motor 11 and has forward and reverse points; and the control 52 is connected to operate the bridge motor 12 and has three points in each direction.

When the control 50 is turned to the hoist point the coil E is energized which closes the contacts E1, FIGURE 1, to the hoist motor 10 and opens the normally closed contacts E2, FIGURE 2, which disables the lowering point. On the other hand, when the control 50 is turned to the lower point the coil F is energized which closes the contacts F1, FIGURE 1, to the motor 10 and opens the normally closed contacts F2, FIGURE 2, which makes the hoist point unavailable.

When the control 51 is turned to its forward point the coil G is energized which closes the normally open contacts G1 that lead to the trolley motor 11, and also opens the normally closed contacts G2 which makes the reverse point inoperative. When this control 51 is turned to the reverse point the coil H is energized which closes the normally open contacts H1, FIGURE 1, and opens the normally closed contacts H2, FIGURE 2, which makes the forward point of this control inoperative.

The network 34 gradually accelerates the bridge 12 as the control 52 is turned to the three right and left points. At the first right point the coil J is energized which closes the normally open contacts J1, FIGURE 1, leading to the primary winding 12a of the motor 12 and opens the normally closed contacts J2 which makes the coil K unavailable. At this point the motor 12 exerts minimum torque since all of the resistors 35–37 are connected in the rotor winding 12b. When the control 52 is turned to the second right point the coil L is also picked up since the contacts K3 are closed due to the energization of the coil K. The accelerating contacts L1 in the network 34, FIGURE 1, are then closed and the resistors 34 are shorted out which causes the motor 12 to exert greater torque and increase its speed.

Energization of the coil L also closes the normally open contacts L2 connected in series with the coil O of a timing relay. This relay is designed to close its contacts at predetermined time after its coil is energized. The contacts O1 of this timing relay are connected in series with the coil M, so that the accelerating contacts M1 will close as soon as the timing relay contacts O1 close and the control 52 is turned to the third right point.

When the coil M is picked up the normally open contacts M2 are closed and the coil P of a second timing relay is energized. The contacts P1 of this timing relay close a predetermined time later and the coil N is picked up which in turn closes the accelerating contacts N1 in the network 34, FIGURE 1. At this point all of the resistors 35–37 are shorted out and the torque output of the motor 12 is at its maximum value.

It can be seen that when the control 52 is thrown to the third right point the motor 12 will gradually increase its speed at a rate that is determined primarily by the two timing relays. The operation of the motor 12 when the control 52 is turned to the three left points is identical except that the coil K is energized instead of the coil J, which closes the contacts K1, FIGURE 1, and causes the motor 12 to rotate in the opposite direction.

The floor control station for the three motors 10, 11 and 12 include one of the stop switches 45 and 46, the floor start switch 50 and six normally open push-button switches 53–58. The latter six switches are made available when the coil B is picked up by closing the switch 50 and the normally open contacts B4 are closed.

The switch 53 is connected to operate the motor 10 in the hoist direction by picking up the coil E and the switch 54 is connected to operate this motor 10 in the lowering direction by picking up the coil F. Similarly, the push-button switch 55 is connected to operate the trolley motor 11 in the forward direction by picking up the coil G and the switch 56 is connected to operate this motor 11 in the reverse direction by picking up the coil H.

The two push-button switches 57 and 58 are connected so that the bridge motor 12 will rotate in the right and left directions, respectively, and so that the accelerating circuit for the motor 12 is automatically made operative under certain conditions and while nevertheless ensuring that the bridge will never move faster than the operator on the floor can walk. This is accomplished by connecting the contacts 59 of the speed sensitive switch 41, FIGURE 1, into this circuit.

When the switch 50 and the contacts B4 are initially closed the motor 12 is at a standstill and the speed sensitive contacts 59 are closed. If the bridge is to be moved toward the right the switch 57 is closed which picks up the coil J and closes the contacts J1 leading to the motor 12. The contacts J3 are also closed and the coil L is picked up through the normally closed contacts A6. Consequently the accelerating contacts L1, FIGURE 1, in the network 34 are also closed and the bridge motor 12 accelerates. The contacts L2 also close and the coil O of the timing relay is picked up; shortly thereafter the contacts O1 close and the coil M is energized through the normally closed contacts A7. The contacts M1, FIGURE 1, close, shorting out the resistors 35 and 36 and speeding up the motor 12. Power is also applied to the coil P of the second timing relay through the closed contacts M2, and the coil N is energized as soon as the contacts P1 of the timing relay close. This action shorts out all of the resistors in the network 34 and the motor 12 applies maximum torque.

The preceding discussion has assumed, of course, that the speed sensitive switch contacts 59 are closed this entire time. This switch is designed to open the contacts 59 and disconnect power from the coils L and M and disable the accelerating circuit in the event the speed of the motor 12 rises above a predetermined upper limit. This upper limit can be adjusted prior to the installation of the system.

In the operation of the bridge motor 12 from the floor control station the switch 57 is closed and the torque output of the motor 12 gradually increases at a rate that is determined primarily by the timing relays in the accelerating circuit. The contacts in the accelerating circuit then open and close as required by the speed sensitive switch, and thereby maintain a nearly constant speed which is determined by the setting of this speed sensitive switch.

The operation of the bridge motor 12 in the opposite direction is exactly the same except that the push-button switch 58 is closed and the coil K is energized.

Suitable fuses, overload relays, etc., can be added to the circuits in a conventional manner by those skilled in the art if desired. Obviously, dual motors can be used in each case instead of one as shown.

It is apparent that a novel and useful dual control system for a crane has been provided. The system is sensitive to the speed of the bridge only when the system is being controlled from a floor station and the accelerating circuit is cut out only as a function of the speed of the bridge, so that sufficient torque can still be developed in the event the crane is carrying a heavy load or the bridge is moving over bad track conditions. Such a system has numerous advantages. For example, within the normal range of crane speeds it allows complete separation of the floor and cab station control speeds. While the bridge speed cannot rise above a predetermined value when being operated from the floor station, nevertheless there are no restrictions on the torque available.

It will be apparent that modifications may be effected without departing from the scope of the novel concepts of the present invention.

The embodiments of the invention in which an exclusive property or privilege is claimed are defined as follows:

1. A dual control system for a wound rotor induction motor drive, the motor having a primary winding and a rotor winding, comprising an accelerating circuit adapted to be connected to the rotor winding, said accelerating circuit including a network of resistors and relay contacts connected in such a manner that said resistors are successively shorted out as said relay contacts are closed, a control circuit that includes the operating windings for said relay contacts in said accelerating circuit, said control circuit including first and second control stations, said first control station including a master control having a plurality of points in each of two directions, a plurality of timing means in said control circuit, said control circuit being adapted to close said relay contacts in said accelerating circuit successively as said master control is turned to the various points and said plurality of timing means operate, said second control station being connected to operate said plurality of timing means and said relay contacts, and means coupled to said first control station which is responsive to the speed of the motor for making said accelerating circuit unavailable when the speed of the motor varies outside of a predetermined limit thereby maintaining a predetermined speed of said motor.

2. A dual control system for a wound rotor induction motor drive, the motor having a primary winding and a rotor winding, comprising an accelerating circuit adapted to be connected to the rotor winding, said accelerating circuit including first, second and third resistors and first, second and third relay contacts, said resistors and said contacts being connected in such a manner that said resistors are successively shorted out as said contacts are closed, a control circuit including means to operate said first, second and third relay contacts, first and second control stations connected to operate said control circuit, said first control station having a master switch with a plurality of points, a plurality of timing means connected in said control circuit, said control circuit being such that the operating windings for said relay contacts in said accelerating circuit are energized as said master switch is turned to said plurality of points and said plurality of timing means operate, said second control station being connected to selectively energize said operating windings of said relay contacts as a manually operable switch is closed and said plurality of timing means operate, and means selective to the speed of the motor which is connected to make the control windings for said relay contacts unavailable when the speed of the motor varies outside of a predetermined limit.

3. A dual control system for a crane that has a hoist motor, a trolley motor, and a bridge motor, means for connecting the primary winding of the hoist motor to a source of electric power through first and second switches, said first and second switches being connected to be closed by signals received from a control circuit, the connections to the primary winding of the hoist motor being such that when said first switch is closed the hoist motor operates in a first direction and when said second switch is closed the hoist motor operates in the opposite direction, said control circuit also including a first lockout circuit that prevents said first and second switches from closing at the same time, a brake coupled to the hoist motor which is connected to be released whenever power is applied to the hoist motor and to set when power is disconnected, means connecting the trolley motor to a source of electric power, second and third switch means connected between the source of electric power and the trolley motor, the connections being such that the trolley motor rotates in a first direction when said third switch is closed due to signals received from said control circuit and the trolley motor rotates in the opposite direction when said fourth switch is closed due to signals received from said control circuit, said control circuit including a second lockout circuit which prevents said third and fourth switches from closing at the same time, the bridge motor being a wound rotor induction motor type having a primary winding and a rotor winding, means connecting the primary winding to a source of electric power, fifth and sixth switch means connected between the primary winding and the source of electric power, the connections being such that the bridge motor rotates in a first direction when said fifth switch is closed and the bridge motor rotates in the opposite direction when said sixth switch is closed, said control circuit including a third lockout circuit which prevents said fifth and sixth switches from closing at the same time, an accelerating circuit adapted to be connected to the rotor winding of the hoist motor, said accelerating circuit being responsive to said control circuit, first and second control stations for operating said accelerating circuit, and means connected in said control circuit which is responsive to the speed of the bridge motor for disabling a portion of said accelerating circuit when the first control station is being used and the speed of the bridge motor rises above a predetermined upper limit.

References Cited by the Examiner
UNITED STATES PATENTS

| | | | |
|---|---|---|---|
| 1,438,616 | 12/22 | Staege | 318—241 |
| 2,277,578 | 3/42 | Booth | 318—548 X |
| 2,400,999 | 3/46 | Kresser | 318—240 X |
| 2,434,636 | 1/48 | Bollaert | 318—546 X |
| 2,596,347 | 5/52 | Spafford | 318—51 X |
| 2,634,389 | 4/53 | Leitch et al. | 318—397 X |
| 2,829,328 | 4/58 | Seeger | 318—462 X |
| 3,039,029 | 6/62 | Spafford | 318—257 X |

FOREIGN PATENTS 353,575  7/31  Great Britain.

ORIS L. RADER, *Primary Examiner.*

JOHN F. COUCH, *Examiner.*